United States Patent [19]

Kaneko et al.

[11] Patent Number: 5,235,012
[45] Date of Patent: Aug. 10, 1993

[54] METHOD FOR POLYMERIZING VINYL CHLORIDE WITH CONTROLLED WATER ADDITION

[75] Inventors: Ichiro Kaneko, Ibaraki; Tadashi Amano, Kanagawa; Toshimichi Koga, Ibaraki, all of Japan

[73] Assignee: Shin-Etsu Chemical Co., Ltd., Tokyo, Japan

[21] Appl. No.: 871,504

[22] Filed: Apr. 21, 1992

[30] Foreign Application Priority Data

Apr. 25, 1991 [JP] Japan .................... 3-122706

[51] Int. Cl.$^5$ .............................................. C08F 2/20
[52] U.S. Cl. ...................................... 526/200; 525/81; 525/202
[58] Field of Search ........................ 526/81, 200, 202

[56] References Cited

U.S. PATENT DOCUMENTS

3,485,808  12/1969  Wiesner ........................ 526/81
4,845,174   7/1989  Amano .......................... 526/62
5,089,575   2/1992  Arima ........................... 526/200

FOREIGN PATENT DOCUMENTS

136842  8/1979  Fed. Rep. of Germany .

*Primary Examiner*—Christopher Henderson
*Attorney, Agent, or Firm*—McAulay Fisher Nissen Goldberg & Kiel

[57] ABSTRACT

An improved method for the suspension polymerization is proposed which gives a PVC resin product having an increased plasticizer absorptivity and greatly decreased content of fish eyes. The invention can be achieved by additionally adding a limited volume of water into the polymerization mixture under proceeding of the polymerization reaction within a specified period of 30 to 70% monomer conversion and at such a controlled rate as not to unduly decrease the pressure inside of the reactor. The improvements are particularly remarkable when the dispersing agent added to the polymerization mixture is a ternary combination of (A) a water-soluble partially saponified polyvinyl alcohol of a high degree of polymerization and a high degree of saponification, (B) a hydroxypropyl methyl cellulose having specified degrees of substitution with methoxy and hydroxypropoxy groups and specified viscosity characteristics and (C) a monomer-soluble partially saponified polyvinyl alcohol of a low degree of polymerization and a low degree of saponification, each in a specified amount.

1 Claim, 1 Drawing Sheet

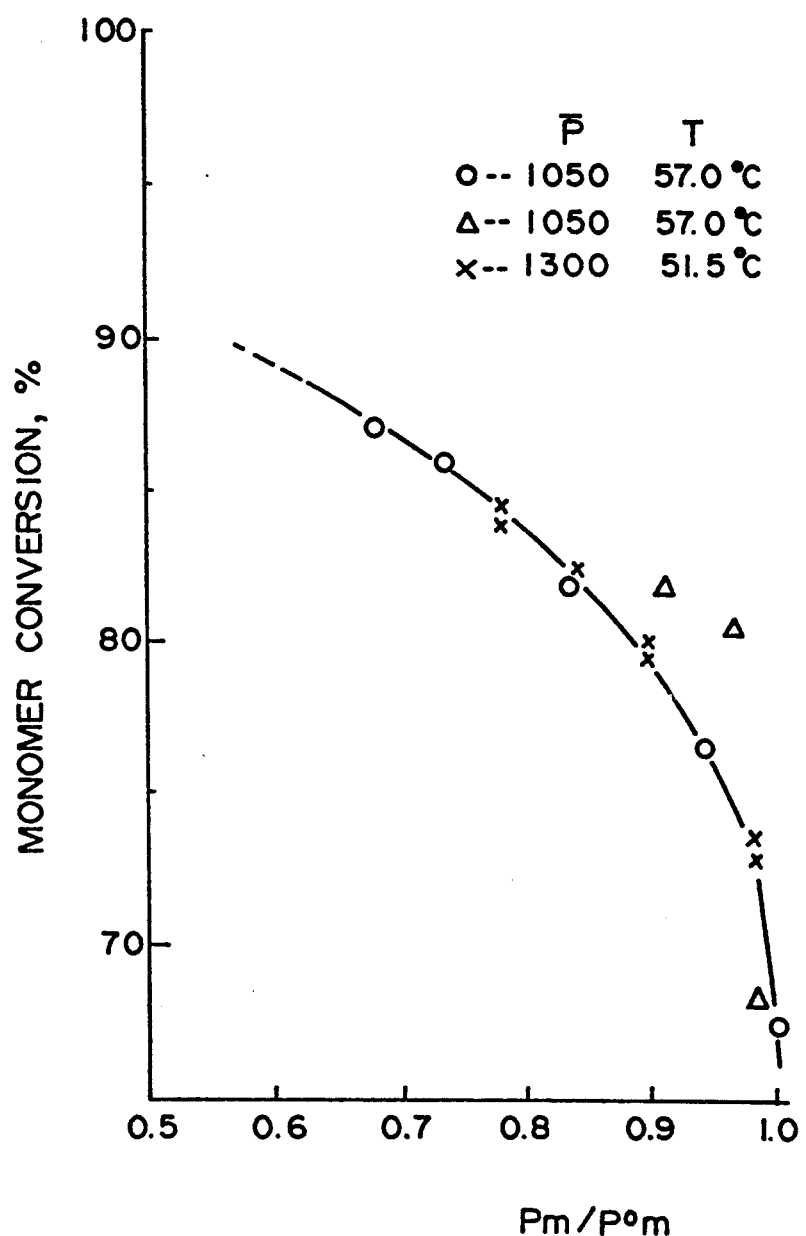
FIGURE

METHOD FOR POLYMERIZING VINYL CHLORIDE WITH CONTROLLED WATER ADDITION

BACKGROUND OF THE INVENTION

The present invention relates to a method for the preparation of a polyvinyl chloride resin or, more particularly, to a method for the preparation of a polyvinyl chloride resin by the process of suspension polymerization of vinyl chloride monomer in an aqueous polymerization medium containing a water-soluble dispersing agent dissolved therein capable of giving a resin product containing a greatly decreased amount of fish eyes and having a greatly increased porosity of the resin particles.

As is well known, polyvinyl chloride, referred to as PVC hereinbelow, resins are mostly produced in the form of a resin powder by the method of suspension polymerization of vinyl chloride monomer or a monomer mixture mainly composed of vinyl chloride in an aqueous polymerization medium containing a water-soluble dispersing agent dissolved therein to stabilize the suspension of the monomer droplets in the aqueous medium. Among the various requirements for the PVC resin products, higher porosity of the resin particles and smaller content of fish eyes are some of the most important properties of the resin powder from the standpoint of workability. In this regard, a proposal has been made in Japanese Patent Kokai 52-5886, 52-15780, 55-112210 and 53-6392 and Japanese Patent Publication 61-18562, according to which the water-soluble dispersing agent is used in combination with a partially saponified polyvinyl alcohol insoluble in water but soluble in the monomer having a low degree of saponification not exceeding 55% and a low average degree of polymerization not exceeding 600. This method is indeed effective in obtaining a PVC resin having somewhat increased porosity and somewhat decreased content of fish eyes as well as a decreased content of unreacted vinyl chloride monomer absorbed in the resin particles which may cause a serious problem of environmental pollution. This method is not quite satisfactory in all respects because, when the plasticizer used in compounding a resin composition is a trimellitate ester-based or polyester-based one, the amount of the fish eyes is rather increased and the increase in the porosity of the particles causes an increase in the apparent consistency of the polymerization mixture in the form of an aqueous slurry, especially, in the later stage of the polymerization reaction so that the polymerizate slurry is less flowable to decrease the efficiency for the removal of the heat of polymerization resulting in an eventual degradation in the quality of the resin product.

SUMMARY OF THE INVENTION

The present invention accordingly has an object to provide a novel, improved and highly productive method for the suspension polymerization of vinyl chloride monomer in an aqueous polymerization medium capable of giving a PVC resin with a greatly decreased content of fish eyes irrespective of the type of the plasticizer.

Thus, the present invention provides a method for the preparation of a PVC resin by the suspension polymerization of vinyl chloride monomer or a monomer mixture mainly composed of vinyl chloride in an aqueous polymerization medium contained in a polymerization reactor at a polymerization temperature in the presence of a dispersing agent and a monomer-soluble polymerization initiator, which method comprises:

additionally adding water at a temperature not exceeding the polymerization temperature in an amount in the range from 10 to 30% based on the amount of the aqueous medium in the polymerization reactor before the start of the polymerization reaction to the aqueous polymerization medium in the polymerization reactor during proceeding of the polymerization reaction at such a rate that the pressure inside the polymerization reactor is not lower than the saturation vapor pressure of the vinyl chloride monomer or the monomer mixture at the polymerization temperature by more than 1 kg/cm$^2$ within a period when conversion of the monomer or monomers into polymer is in the range from 30% to 70% by weight, the dispersing agent being a ternary combination consisting of (A) a first partially saponified polyvinyl alcohol having an average degree of polymerization in the range from 1500 to 2700 and degree of saponification in the range from 75 to 99%, (B) a hydroxypropyl methyl cellulose having degrees of substitution with methoxy groups and hydroxypropoxy groups in the ranges from 26 to 30% by weight and from 4 to 15% by weight, respectively, and giving a 2% by weight aqueous solution having a viscosity in the range from 5 to 4000 centipoise or, preferably, from 5 to 1000 centipoise at 20° C., and (C) a second partially saponified polyvinyl alcohol having an average degree of polymerization in the range from 150 to 600 and a degree of saponification in the range from 20 to 55%, in such amounts that the total amount of the dispersing agents (A) and (B) is in the range from 0.01 to 0.50% by weight or, preferably, from 0.02 to 0.20% by weight with a weight ratio of the dispersing agent (A) to (B) in the range from 9:1 to 1:9 or, preferably, from 9:1 to 2:8 and the amount of the dispersing agent (C) is in the range from 0.01 to 1.00% by weight, each % amount being based on the amount of the monomer or monomer mixture.

BRIEF DESCRIPTION OF THE DRAWING

The FIGURE is a graph showing the relationship between % conversion of vinyl chloride monomer into polymer and the ratio of $P_m:P0_m$, in which $P_m$ is the pressure inside of the polymerization reactor and $P0_m$ is the vapor pressure of the vinyl chloride monomer per se at the temperature of the polymerizate slurry in the reactor.

DETAILED DESCRIPTION OF THE PREFERRED EMBODIMENTS

As is described above, the most characteristic feature of the inventive method consists in the additional addition of water at a controlled rate to the polymerization mixture during proceeding of the polymerization reaction within a specified period. The advantages obtained by this method are particularly remrkable when the dispersing agent is a ternary combination of each a specified amount of the above described dispersing agents (A), (B) and (C).

The dispersing agent (A) is a water-soluble partially saponified polyvinyl alcohol having an average degree of polymerization in the range from 1500 to 2700 and a degree of saponification in the range from 75 to 99%. When the average degree of polymerization and/or the degree of saponification are too low, the PVC resin powder obtained by the suspension polymerization would have a bulk density not high enough as desired along with an eventual increase in the amount of polymer scale deposition on the reactor walls, in particular, when it is used in combination with the dispersing agent (C) described below. When the average degree of polymerization and/or the degree of saponification are too high, on the other hand, the porosity of the resin particles would be decreased and the content of fish eyes in the resin product would be increased.

The dispersing agent (B) is a water-soluble hydroxypropyl methyl cellulose having degrees of substitution with methoxy groups and hydroxypropoxy groups in the ranges from 26 to 30% by weight and from 4 to 15% by weight, respectively, and giving a 2% by weight aqueous solution having a viscosity in the range from 5 to 4000 centipoise or, preferably, from 5 to 1000 centipoise at 20° C. When the degree of substitution with methoxy groups and/or the degree of substitution with hydroxypropoxy groups are too low, the porosity of the resin particles would not be so high as desired. When the degree of substitution with methoxy groups and/or the degree of substitution with hydroxypropoxy groups are too high, on the other hand, the PVC resin powder obtained therewith would have a somewhat broader particle size distribution to cause a disadvantage in the workability of the resin powder in molding.

The dispersing agents (A) and (B) are added to the aqueous medium in a total amount in the range from 0.01 to 0.50% by weight or, preferably, from 0.02 to 0.20% by weight based on the amount of the monomer or monomer mixture. When the amount of the dispersing agent (B) is too small relative to the dispersing agent (A), the porosity of the PVC resin particles obtained thereby would be decreased.

The dispersing agent (C) is a water-insoluble partially saponified polyvinyl alcohol having an average degree of polymerization in the range from 150 to 600 or, preferably, from 200 to 500 and a degree of saponification in the range from 20 to 55% or, preferably, from 30 to 50%. When the average degree of polymerization is too low, the PVC resin powder obtained thereby would have a somewhat broadened particle size distribution while, when the average degree of polymerization is too high, the porosity of the resin particles would be decreased. When the degree of saponification thereof is too low, the resin powder would have a bulk density not high enough as desired while, when the degree of saponification thereof is too high, the porosity of the resin particles would be also decreased.

The amount of the dispersing agent (C) added to the aqueous polymerization medium is in the range from 0.01 to 1.00% by weight or, preferably, from 0.01 to 0.50% by weight based on the amount of the vinyl chloride monomer or monomer mixture. When the amount thereof is too small, the content of fish eyes in the PVC resin product cannot be decreased as desired while, when the amount thereof is too large, the stability of the suspension would be somewhat decreased resulting in a broadened particle size distribution of the PVC resin particles.

The most characteristic feature of the inventive method consists, as is mentioned before, in the additional addition of water to the polymerization mixture under proceeding of the polymerization reaction. The additional addition of water is undertaken at any moment when conversion of the monomer or monomer mixture into polymer is in the range from 30 to 70% by weight either continuously or intermittently. The amount of water additionally added to the polymerization mixture is in the range from 10 to 30% of the amount of water forming the aqueous polymerization medium before the start of the polymerization reaction. When the additional addition of water is undertaken too early, an adverse influence is caused on the stability of the suspension so that the PVC resin product obtained thereby would have a coarser particle size distribution or somewhar decreased bulk density. When the additional addition of water is undertaken belatedly, on the other hand, a difficulty is caused in the control of the torque for the agitation of the polymerization mixture, especially, at the later stage of the polymerization reaction resulting in poor agitation of the polymerizate slurry to decrease the efficiency of heat removal so that the temperature of the polymerizate slurry may be unduly increased and the PVC resin product may eventually be colored in addition to the disadvantage due to broadening of the particle size distribution or decrease in the bulk density and increase in the content of fish eyes.

The temperature of the water for the additional addition should not exceed the polymerization temperature so that the additional addition of water to the polymerization mixture may cause a decrease in the temperature of the mixture and consequently a decrease in the pressure inside of the reactor. It is essential in the inveentive method that the pressure inside the polymerization reactor is kept not lower than the saturation vapor pressure of the monomer or monomer mixture at the polymerization temperature by more than 1 kg/cm$^2$ even by the additional addition of water, which is at a temperature not higher than the polymerization temperature, to the polymerization mixture. When the pressure drop caused by the additional addition of water is too large, the consistency of the polymerizate slurry in the reactor is unduly increased resulting in an uneven temperature distribution of the slurry and hence occurrence of coarser resin particles. An excessive cooling of the polymerization mixture by the additional addition of cold water can be compensated for by increasing the heating intensity although it is important that the temperature of the polymerization mixture never exceeds 80° C. in order to prevent coloration of the resin product. The polymerization reaction is continued in this manner until conversion of the monomer or monomer mixture into polymer reaches 80% to 95% when the unreacted monomer is purged out of the reactor so as to terminate the polymerization reaction.

It is known that the solubility of the unreacted monomer or the amount of the monomer absorbed in the polymer particles already formed depends on the conversion of the monomer into polymer. According to the disclosure in Polymer Preprints, volume 15, pages 197 to 202 (1974), the amount of the unreacted monomer absorbed in the polymer particles is independent on the temperature of the slurry provided that the pressure inside of the polymerization reactor $P_m$ to the vapor pressure of the monomer per se at the temperature of the polymerizate slurry in the reactor $P^0_m$, i.e. $P_m:P^0_m$, is 0.6 or larger. The figure of the accompanying drawing is a graph showing the relationship between % conversion of vinyhl chloride monomer into polymer and the ratio of $P_m:P^0{}_m$ obtained in three series of polymerization runs carried out at polymerization temperatures T of 57.0° C. and 51.0° C. to give PVC resin products having average degrees of polymerization $\bar{P}$ of 1050 and 1300, respectively. This graph can be used for appropriately selecting the moment for the termination of the polymerization reaction when % monomer conversion into polymer has reached a desired value. Namely, the value of $P_m:P^0{}_m$ corresponding to the desired % monomer conversion can be obtained from the graph so that the polymerization reaction is terminated at a moment when the value of $P_m$ measured by a pressure gauge and the value of $P^0{}_m$ corresponding to the temperature of the polymerizate slurry gives the above obtained value of $P_m:P^0{}_m$.

The method of the present invention is applicable not only to the homopolymerization of vinyl chloride monomer alone but also to the copolymerization of a monomer mixture of vinyl chloride with one or more of ethylenically unsaturated comonomers copolymerizable with vinyl chloride provided that the major constituent of, for example, 50% by weight or more is vinyl chloride. Examples of the copolymerizable comonomers include vinyl esters such as vinyl acetate and vinyl propionate, alkyl esters of acrylic and methacrylic acids such as methyl acrylate, ethyl acrylate and methyl methacrylate, olefins such as ethylene and propylene, maleic anhydride, acrylonitrile, styrene, vinylidene chloride and the like.

The suspension polymerization of vinyl chloride poroceeds in the presence of a monomer-soluble polymerization initiator which can be any of conventional ones used in the suspension polymerization of vinyl chloride in the prior art. Examples of suitable polymerization initiators include perester compounds such as tert-butylperoxy neodecanoate, tert-butylperoxy pivalate, tert-hexylperoxy pivalate, α-cumylperoxy neodecanoate, tert-hexyl neohecanoate, and 2,4,4-trimethylpentyl-2-peroxy 2-neodecanoate, percarbonate compounds such as diisopropylperoxy dicarbonate, di-2-ethylhexylperoxy dicarbonate, di-2-ethoxyethylperoxy dicarbonate and dimethoxyisopropylperoxy dicarbonate, organic peroxide compounds such as decanoyl peroxide, lauroyl peroxide, benzoyl peroxide, cumene hydroperoxide, cyclohexanone peroxide, 2,4-dichlorobenzoyl peroxide, p-menthane hydroperoxide, 3,5,6-trimethylhexanoyl peroxide, isobutyryl peroxide and acetyl cyclohexylsulfonyl peroxide and azo compounds such as α,α'-azobisisobutyronitrile, α,α'-azobis(2,4-dimethyl valeronitrile) and α,α'-azobis(4-methoxy-2,4-dimethyl valeronitrile). These monomer-soluble polymerization initiators can be used either singly or as a combination of two kinds or more according to need. It is further optional that the monomersoluble polymerization initiator is used in combination with a water-soluble polymerization initiator such as potassium persulfate, ammonium persulfate and hydrogen peroxide.

It is further optional that the polymerization mixture for the polymerization according to the inventive method is admixed with various kinds of known additives conventionally used in the suspension polymerization of vinyl chloride including polymerization regulators, chain transfer agents, pH-controlling agents, gelation improvers, antistatic agents, scale deposition inhibitors and the like each in a limited amount. The stability of the suspension can be sometimes improved by the addition of a surface active agent to the polymerization mixture in combination with the above described dispersing agents (A), (B) and (C).

Excepting the additional addition of water in the course of the polymerization reaction and the preferable combination of the three kinds of the specific dispersing agents, the conditions for the suspension polymerization of vinyl chloride monomer can be conventional without particular limitations including the volume of the aqueous polymerization medium relative to the amount of the monomer, amount of the polymerization initiator, polymerization temperature and so on.

In the following, the method of the present invention is described in more detail by way of examples. The PVC resin product obtained in the experiment was evaluated by testing for the bulk density of the resin powder, particle size distribution, amount of plasticizer absorption, content of fish eyes and degree of coloration according to the following testing procedures.

Bulk density: Measurement was performed according to the procedure specified in JIS K 6721.

Particle size distribution: Measurement was performed according to the procedure specified in JIS Z 8801. The results were recorded in % by weight of the amounts of the resin powder passing through screens having mesh openings of 60 meshes, 120 meshes and 200 meshes per inch.

Amount of plasticizer absorption: A 10 g portion of the sample resin powder was taken in a cylindrical vessel of an aluminum alloy having an inner diameter of 25 mm and a depth of 85 mm and holding a pack of glass fibers at the bottom and then 15 ml of dioctyl phthalate as a plasticizer were poured thereinto followed by standing at room temperature for 30 minutes as such so as to have the plasticizer fully absorbed into the resin powder. Thereafter, the vessel was subjected to centrifugation at an acceleration of 1500 G for 60 minutes so as to separate the unabsorbed dioctyl phthalate and the amount of the plasticizer absorbed by the resin was recorded in % by weight relative to the amount of the resin.

Content of fish eyes (Test I): A 25 g portion of a resin composition composed of 100 parts by weight of the resin sample, 1 part by weight of tribasic lead sulfate, 1.5 parts by weight of lead stearate, 0.2 part by weight of titanium dioxide, 0.1 part by weight of carbon black and 50 parts by weight of dioctyl phthalate was kneaded for 3 minutes or 5 minutes on a two-roller mill at 145° C. followed by sheeting into a sheet having a thickness of 0.2 mm, of which the number of translucent spots was counted on a 100 cm² area.

Content of fish eyes (Test II): A 25 g portion of a resin composition composed of 100 parts by weight of the resin sample, 1 part by weight of barium- and zinc-containing powdery stabilizer, 1 part by weight of a barium- and zinc-containing liquid stabilizer, 5 parts by weight of an epoxidized soybean oil, 0.5 part by weight of titanium dioxide, 0.1 part by weight of carbon black and 65 parts by weight of TOTM was kneaded for 3 minutes or 5 minutes on a two-roller mill at 155° C. followed by sheeting into a sheet having a thickness of 0.3 mm, of which the number of translucent spots was counted on a 100 cm² area.

Degree of coloration: A resin composition composed of 100 g of the resin sample, 50 g of dioctyl phthalate, 0.5 g of a cadmium- and tin-containing stabilizer and 1 g of a dibutyltin dilaurate-based stabilizer was kneaded for 5 minutes on a two-roller mill at 160° C. followed by sheeting into a sheet and a stack of the sheets was compression-molded at 160° C. under a pressure of 120 kg/cm² into a plate having a thickness of 15 mm, of which yellowness was determined according to the procedure specified in JIS K 7105 to give the so-called YI values which were recorded as Good, Fair and Poor when the YI value was lower than 30, between 30 and 40 or higher than 40, respectively.

EXAMPLE 1

Into a stainless steel polymerization reactor of 2000 liter capacity were introduced 900 kg of deionized water, 158 g of a first partially saponified polyvinyl alcohol having an average degree of polymerization of 2550 and a degree of saponification of 80% (dispersing agent A), 158 g of a hydroxypropyl methyl cellulose having degrees of substitution with methoxy groups and hydroxypropoxy groups of 29% by weight and 10% by weight, respectively, and giving a 2% by weight aqueous solution having a viscosity of 50 centipoise at 20° C. (dispersing agent B) and 378 g of a second partially saponified polyvinyl alcohol having an average degree of polymerization of 250 and a degree of saponification of 48% (dispersing agent C) to form an aqueous polymerization medium.

The polymerization reactor was then evacuated down to a pressure of −700 mmHg relative to the atmospheric pressure followed by introduction of 630 kg of vinyl chloride monomer and 570 g of tert-butylperoxy neodecanoate as a polymerization initiator under agitation to form a polymerization mixture. Temperature of the polymerization mixture was increased up to 51.0° C. so as to start the polymerization reaction which was continued by keeping the temperature of the mixture at 51.0° C. During the period when conversion of the monomer into polymer was in the range from 40% to 60%, 200 kg of deionized water at room temperature was continuously introduced into the reactor at an approximately constant rate. The pressure inside of the reactor was dropped by the addition of cold water and, when the pressure drop reached 0.5 kg/cm²as compared with the saturation vapor pressure of vinyl chloride at 51.0° C., i.e. 7.3 kg/cm²G, the temperature of the polymerization mixture was further increased up to 70° C. within 30 minutes so that the pressure inside of the reactor was increased to 8.9 kg/cm²G. The unreacted vinyl chloride monomer was then purged out of the reactor so as to terminate the polymerization reaction. The conversion of the monomer into polymer here was estimated as 85%. The polymerizate slurry was discharged out of the reactor and dehydrated and dried in a conventional manner.

Table 1 below summarizes the data obtained by the evaluation tests of the thus prepared PVC resin product according to the procedures described above.

EXAMPLE 2

The experimental procedure was substantially the same as in Example 1 except that: the amounts of the dispersing agents A, B and C were 157.5 g, 157.5 g and 378 g, respectively; and the amount of deionized water additionally added was 100 kg, which was introduced into the reactor during a period when conversion of the monomer into polymer was in the range from 30% to 70%.

The results of the evaluation tests of the PVC resin product are shown also in Table 1.

EXAMPLE 3

The experimental procedure was substantially the same as in Example 1 except that: the amounts of the dispersing agents A, B and C were 132.3 g, 308.7 g and 441 g, respectively; and the amount of deionized water additionally added was 90 kg, which was introduced into the reactor during a period when conversion of the monomer into polymer was in the range from 30% to 60%.

The results of the evaluation tests of the PVC resin product are shown also in Table 1.

EXAMPLE 4

The experimental procedure was substantially the same as in Example 1 except that: the amounts of the dispersing agents A, B and C were 425.3 g, 47.2 g and 504 g, respectively; and the amount of deionized water additionally added was 105 kg, which was introduced into the reactor during a period when conversion of the monomer into polymer was in the range from 45% to 70%.

The results of the evaluation tests of the PVC resin product are shown also in Table 1.

EXAMPLE 5

The experimental procedure was substantially the same as in Example 1 except that: the amounts of the dispersing agents A, B and C were 245.7 g, 163.8 g and 630 g, respectively; and the amount of deionized water additionally added was 200 kg, which was introduced into the reactor during a period when conversion of the monomer into polymer was in the range from 30% to 70%.

The results of the evaluation tests of the PVC resin product are shown also in Table 1.

EXAMPLE 6

The experimental procedure was substantially the same as in Example 1 except that: the amounts of the dispersing agents A, B and C were 157.5 g, 157.5 g and 630 g, respectively; and the amount of deionized water additionally added was 250 kg, which was introduced into the reactor during a period when conversion of the monomer into polymer was in the range from 30% to 70%.

The results of the evaluation tests of the PVC resin product are shown also in Table 1.

COMPARATIVE EXAMPLE 1

The experimental procedure was substantially the same as in Example 1 except that: the amount of deionized water additionally added was 50 kg, which was introduced into the reactor during a period when conversion of the monomer into polymer was in the range from 40% to 70%; and the temperature of the polymerization mixture after additional addition of water was raised up to 85° C. and the polymerization reaction was terminated when the pressure inside of the reactor was 8.0 kg/cm²G so that the overall conversion of the monomer into polymer was 92%.

The results of the evaluation tests of the PVC resin product are shown also in Table 2.

COMPARATIVE EXAMPLE 2

The experimental procedure was substantially the same as in Example 1 except that: the amount of deionized water additionally added was 125 kg, which was introduced into the reactor during a period when conversion of the monomer into polymer was in the range from 5% to 25%.

The results of the evaluation tests of the PVC resin product are shown also in Table 2.

COMPARATIVE EXAMPLE 3

The experimental procedure was substantially the same as in Example 1 except that: the amount of deionized water additionally added was 125 kg, which was introduced into the reactor during a period when conversion of the monomer into polymer was in the range from 75% to 90%; and the temperature of the polymerization mixture after additional addition of water was raised up to 82° C. and the polymerization reaction was terminated when the pressure inside of the reactor was 7.3 kg/cm$^2$G so that the overall conversion of the monomer into polymer was 92%.

The results of the evaluation tests of the PVC resin product are shown also in Table 2.

COMPARATIVE EXAMPLE 4

The experimental procedure was substantially the same as in Example 1 except that: the additional addition of water during proceeding of the polymerization reaction was not undertaken; and the temperature of the polymerization mixture was raised at the later stage of the polymerization reaction up to 71° C. and the polymerization reaction was terminated when the pressure inside of the reactor was 9.0 kg/cm$^2$G so that the overall conversion of the monomer into polymer was 85%. It was noted that the temperature of the polymerizate slurry was not uniform at the later stage of the polymerization reaction.

The results of the evaluation tests of the PVC resin product are shown also in Table 2.

COMPARATIVE EXAMPLE 5

The experimental procedure was substantially the same as in Example 1 excepting omission of the dispersing agent C.

The results of the evaluation tests of the PVC resin product are shown also in Table 2.

TABLE 1

| Example No. | 1 | 2 | 3 | 4 | 5 | 6 |
|---|---|---|---|---|---|---|
| Bulk density, g/cm$^3$ | 0.480 | 0.476 | 0.475 | 0.479 | 0.477 | 0.470 |
| Particle size distribution, % by weight passing through screen of | | | | | | |
| 60 meshes | 100.0 | 100.0 | 100.0 | 100.0 | 100.0 | 100.0 |
| 120 meshes | 75.0 | 80.0 | 77.5 | 82.3 | 78.0 | 76.7 |
| 200 meshes | 0.3 | 2.0 | 0.9 | 1.0 | 1.5 | 1.3 |
| Pasticizer absorption, % by weight | 36.5 | 35.0 | 34.5 | 34.0 | 36.5 | 40.0 |
| Fish eyes (Test I), pieces, after kneading for | | | | | | |
| 3 minutes | 0 | 0 | 0 | 0 | 0 | 0 |
| 5 minutes | 0 | 0 | 0 | 0 | 0 | 0 |
| Fish eyes (Test II), pieces, after kneading for | | | | | | |
| 3 minutes | 75 | 150 | 85 | 90 | 60 | 50 |
| 5 minutes | 5 | 17 | 9 | 10 | 7 | 3 |
| Yellowness, YI | Good | Good | Good | Good | Good | Good |

TABLE 2

| Comparative Example No. | 1 | 2 | 3 | 4 | 5 |
|---|---|---|---|---|---|
| Bulk density, g/cm$^3$ | 0.452 | 0.512 | 0.450 | 0.490 | 0.485 |
| Particle size distribution, % by weight passing through screen of | | | | | |
| 60 meshes | 100.0 | 100.0 | 100.0 | 100.0 | 100.0 |
| 120 meshes | 95.0 | 30.5 | 99.0 | 60.5 | 60.0 |
| 200 meshes | 6.0 | 0.1 | 5.0 | 0.2 | 0.5 |
| Plasticizer absorption, % by weight | 35.0 | 35.0 | 34.5 | 35.0 | 29.0 |
| Fish eyes (Test I), pieces, after kneading for | | | | | |
| 3 minutes | 100 | 120 | 50 | 15 | 50 |
| 5 minutes | 15 | 20 | 3 | 1 | 5 |
| Fish eyes (Test II), pieces, after kneading for | | | | | |
| 3 minutes | 350 | 800 | 750 | 200 | 5000 |
| 5 minutes | 25 | 45 | 40 | 25 | 85 |
| Yellowness, YI | Poor | Good | Poor | Poor | Good |

What is claimed is:

1. A method for the preparation of a PVC resin by the suspension polymerization of vinyl chloride monomer or a monomer mixture mainly composed of vinyl chloride in an aqueous polymerization medium contained in a polymerization reactor at a polymerization temperature in the presence of a dispersing agent and a monomer-soluble polymerization initiator, which comprises:

additionally adding water at a temperature not exceeding the polymerization temperature in an amount in the range from 10 to 30% based on the amount of the aqueous medium in the polymerization reactor before the start of the polymerization reaction, to the aqueous polymerization medium in the polymerization reactor during which the polymerization reaction is proceeding the addition being at a rate such that the pressure inside the polymerization reactor is not lower than the saturation vapor pressure of the vinyl chloride monomer or the monomer mixture at the polymerization temperature by more than 1 kg/cm2 within a period when conversion of the monomer or monomers into polymer is in the range from 30% to 70% by weight, the dispersing agent being a ternary combination consisting of (A) a first partially saponified polyvinyl alcohol having an average degree of polymerization in the range from 1500 to 2700 and a degree of saponification in the range from 75 to 99%, (B) a hydroxypropyl methyl cellulose having degrees of substitution with methoxy groups and hydroxypropoxy groups in the ranges from 26 to 30% by weight and from 4 to 15% by weight, respectively, and giving a 2% by weight aqueous solution having a viscosity in the range from 5 to 4000 centipoise at 20° C., and (C) a second partially saponified polyvinyl alcohol having an average degree of polymerization in the range from 150 to 600 and a degree of saponification in the range from 20 to 55%, in such amounts that the total amount of the dispersing agents (A) and (B) is in the range from 0.01 to 0.50% by weight with a weight ratio of the dispersing agent (A) to (B) in the range from 9:1 to 1:9 and the amount of the dispersing agent (C) is in the range from 0.01 to 1.00% by weight, each % amount being based on the amount of the monomer or monomer mixture.

* * * * *